Patented Oct. 31, 1933

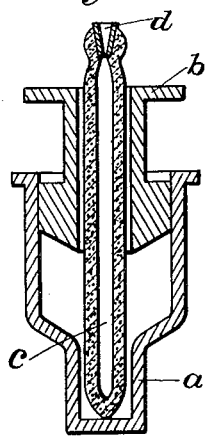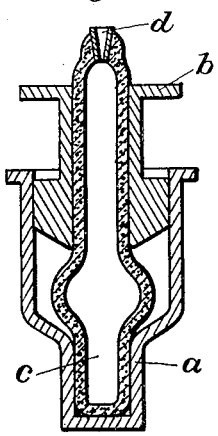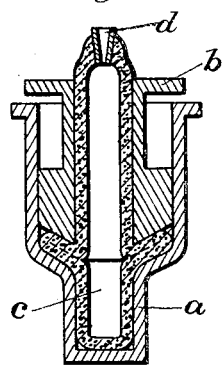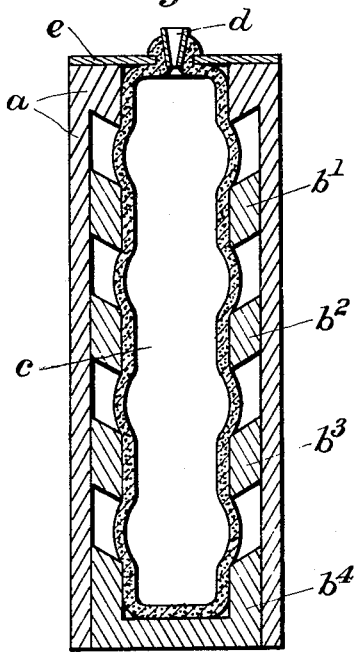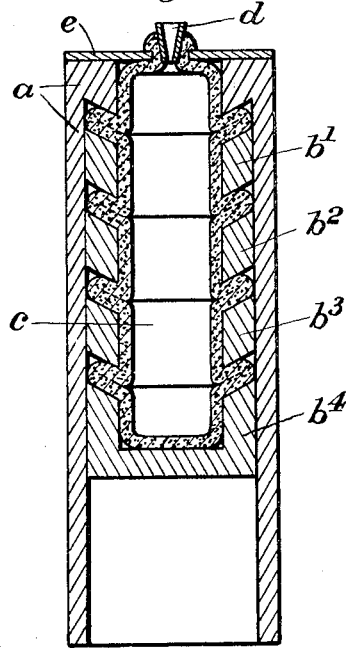

1,932,402

UNITED STATES PATENT OFFICE 1,932,402

PROCESS FOR AND APPARATUS FOR USE IN MOLDING ARTICLES OF FUSED QUARTZ

Alexander O. Freiherr von Beaulieu Marconnay, Berlin, Germany, assignor to The Thermal Syndicate Limited, Wallsend-on-Tyne, England, a corporation of Great Britain Application December 10, 1929, Serial No. 412,987, and in Germany December 10, 1928

3 Claims. (Cl. 49—29)

The distinctive feature of the processes known and at present used for shaping hollow bodies of fused quartz which are intimately connected with and depend upon the fusion process proper requires that with increasing diameters the wall thicknesses of the body decrease in proportion if a gradual, for example conical, change-over from the smaller to the larger diameter occurs. This is manifest in the case of conical pipes of which the wall thickness is almost inversely proportional to the diameter. For instance, in conical pipes of 1 metre in length and 15 to 35 centimetres in diameter the wall thickness at the smaller end of the pipe is about 25 millimetres and at the larger end about 10 millimetres.

This fact leads in a large number of cases to technical difficulties of manufacture, particularly if it is not possible to arrange for a gradual change from small to large diameter, as for example in the case of socket pipes wherein a sudden change-over is unavoidable. Even approximately right-angular changes from smaller to larger diameter are very difficult to make in the molding of fused quartz; if the change takes place at a less angle than 90°, as for instance if it is desired that the upper edge of a hollow body shall incline outwards like a collar or a roof, the difficulties become so great that they cannot be overcome by the molding processes as hitherto known. Invariably a tearing open of the body takes place in making such pieces by the known methods if very limited dimensions are not maintained. Collar rings, for instance, could only be produced if the total height of the rings was not greater than their internal diameter. Rings of this kind, of which the height was greater than the diameter, could not be produced at all by the known methods of molding hollow bodies of fused quartz which all involve the use of fixed molds in which the article is molded by the action of compressed air. It is equally impossible to make shapes in which the hollow body has a collar shaped spigot bent back on itself regardless of the ratio of diameter to height.

The applicant has now found that the difficulties arising in the known processes referred to can be wholly avoided if the known compressed air molding process is combined with a mechanical pressure process. This may be effected by using suitably shaped fixed molds and commencing the molding process with compressed air and then completing the said process by applying mechanical pressure, such for example as by introducing a suitably shaped die into the mold. In this way it is possible to produce not only the shapes hitherto practicable by means of the known processes, for example sockets, in a substantially more certain manner than before with more uniformity of wall thickness, but also a large number of hollow bodies hitherto unproducible, of which the molding and manufacture has only become possible by means of the process according to this invention.

The invention will be more particularly described with reference to the accompanying drawing which illustrates by way of example two arrangements for carrying the invention into effect; wherein Figures 1, 2 and 3 are sections illustrating progressive stages of forming an insulator with one collar and Figures 4 and 5 are sections illustrating progressive stages of forming an insulator with several collars.

In Figures 1, 2 and 3 $a$ is the fixed mold and $b$ the movable mold reciprocable in the said fixed mold $a$. A tubular fused piece $c$ closed at one end and provided with a nozzle $d$ at the other end is introduced in known manner into the two-piece mold as shewn in Figure 1. The fused piece $c$ is then blown out by compressed air in known manner as shewn in Figure 2 and at the same time the movable mold $b$ is pressed into the fixed mold $a$ by pressure as shewn in Figure 3. The part of the fused piece $c$ which has widened out into a spherical shape in the intermediate space between the two molds $a$ and $b$ is now so pressed, by the movement of the said two molds, against each other that the inner surfaces thereof lay firmly on each other as shewn in Figure 3.

Figure 4 shows a multi-piece mold, consisting of a guide piece $a$, movable members $b^1$, $b^2$, $b^3$ and $b^4$ and a cover $e$, in which a fused piece $c$ provided with a nozzle $d$ which has been introduced in known manner is blown out by compressed air so that it forms spherical-shaped enlargements in the hollow spaces between the said movable members. By the simultaneous movement of the mold members $b^1$, $b^2$, $b^3$ and $b^4$ towards each other the spherical-shaped enlargements are so pressed together that their inner surfaces are brought together, and the final form shown in Figure 5 is eventually produced. When employing multi-piece molds for the preparation of insulators with several collars the individual movable members are preferably coupled together by means such that the distances between them are always reduced to the same degree.

The process hereinbefore described is not limited to the molding of collar-insulators, but may be employed in the same way for the preparation of other pieces as for example ribbed tubes and tubes with flanges. Likewise it may be employed especially in those cases when according to the molding process in fixed molds hitherto known, small wall thickness or diameter would be produced by reason of the described dependence of wall-thickness on the diameter.

The use for the shaping of fused quartz articles of this hitherto unknown combined pneumatic and pressing process, the possibilities of the use of which for this purpose, particularly with regard to the special behaviour of fused quartz in plastic molding condition, could not be foreseen, constitutes therefore compared with the known processes an extraordinary economic and technical advance.

In using the phrase "fused quartz" I do not intend to limit this application to fused rock crystal or to imply a distinction between fused rock quartz and fused sand or so-called fused silica.

What I claim is:—

1. A follower mold for forming articles comprising lateral projections which comprises a female member and a male member having sliding fit therein and movable therein without opening the cavity, said members being complementarily shaped on their inner faces so as to define a cavity open at one end for insertion of a blowing means and having a central cavity of smaller transverse dimensions than the part of the female member in which the male member is slidable.

2. A mold as defined in claim 1 in which a series of floating followers are arranged inwardly from the principal follower which closes the mold cavity and are spaced so as to leave enclosed projection-forming spaces between them, all being slidable in the female member substantially to close the projection-forming spaces.

3. The method of molding a hollow article of fused quartz with an annular projection thereon which comprises blowing against a mold portions of a tubular piece which are to form parts of said article on either side of said projection, whereby said parts are chilled and fixed in the desired form, blowing an approximately spherical bulge on said tubular piece into the space between said mold parts, as above specified, and simultaneously moving said mold parts with the already molded and chilled parts toward one another to close together the edges of said bulge and molding material of said bulge by mechanical pressure to coalesce their inner walls and form the desired projection.

ALEXANDER O. FREIHERR von
BEAULIEU MARCONNAY.